United States Patent
Lin et al.

(10) Patent No.: US 9,706,356 B2
(45) Date of Patent: Jul. 11, 2017

(54) POSITIONING SYSTEM AND METHOD

(71) Applicant: HTC Corporation, Taoyuan (TW)

(72) Inventors: Keng-Chih Lin, Taoyuan (TW);
Chien-Ting Ho, Taoyuan (TW);
Chien-Chih Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/668,959

(22) Filed: Mar. 25, 2015

(65) Prior Publication Data
US 2016/0286350 A1  Sep. 29, 2016

(51) Int. Cl.
| | |
|---|---|
| H04B 1/38 | (2015.01) |
| H04M 1/00 | (2006.01) |
| H04W 24/00 | (2009.01) |
| H04W 4/02 | (2009.01) |
| H04W 4/04 | (2009.01) |
| H04B 1/3827 | (2015.01) |

(52) U.S. Cl.
CPC ............ *H04W 4/023* (2013.01); *H04B 1/385* (2013.01); *H04W 4/043* (2013.01)

(58) Field of Classification Search
None
See application file for complete search history.

(56) References Cited

U.S. PATENT DOCUMENTS

| | | | |
|---|---|---|---|
| 2009/0316951 A1 | 12/2009 | Soderstrom | |
| 2011/0057840 A1* | 3/2011 | Ko | G01S 5/0252 342/450 |
| 2011/0117924 A1* | 5/2011 | Brunner | G01S 5/0252 455/456.1 |
| 2011/0237274 A1* | 9/2011 | Wong | G01S 1/68 455/456.1 |

(Continued)

FOREIGN PATENT DOCUMENTS

| | | |
|---|---|---|
| CN | 102726117 A | 10/2012 |
| CN | 102802259 A | 11/2012 |

(Continued)

OTHER PUBLICATIONS

Corresponding Taiwanese Office Action that these art references were cited on May 5, 2016.

*Primary Examiner* — Moustapha Diaby
(74) *Attorney, Agent, or Firm* — CKC & Partners Co., Ltd.

(57) ABSTRACT

A positioning system and method are provided. The positioning system includes a wireless signal source disposed at a known fixed location in an area and a handheld electronic device. The handheld electronic device includes a compass, a wireless transmission module and a processing module. The processing module retrieves information of fixed direction from the compass, determines a first azimuth angle among the handheld electronic device, the wireless signal source, and the fixed direction according to a maximum signal strength between the wireless transmission module (Continued)

relative to the wireless signal source, and determines a first distance between the handheld electronic device and the wireless signal source according to a first wireless transmission parameter between the wireless transmission module and the wireless signal source. The processing module further determines a first absolute location of the handheld electronic device according to the first azimuth angle and the first distance.

14 Claims, 3 Drawing Sheets

(56) References Cited

U.S. PATENT DOCUMENTS

| | | | | |
|---|---|---|---|---|
| 2011/0244883 A1* | 10/2011 | Quade | ............... | G01S 5/08 |
| | | | | 455/456.1 |
| 2013/0121173 A1* | 5/2013 | Chen | ............... | H04W 24/08 |
| | | | | 370/252 |
| 2015/0170504 A1* | 6/2015 | Jooste | ............... | A61B 5/6898 |
| | | | | 340/539.12 |

FOREIGN PATENT DOCUMENTS

| | | |
|---|---|---|
| TW | 200901729 A | 1/2009 |
| TW | 201349870 A | 12/2013 |

* cited by examiner

POSITIONING SYSTEM AND METHOD

BACKGROUND

Field of Disclosure

The present disclosure relates to a positioning technology. More particularly, the present disclosure relates to a positioning system and a method of the same.

Description of Related Art

Handheld electronic devices are essential communication tools for people in the modern life. Besides equipped with the communication function, handheld electronic devices have more and more powerful data operating and processing ability to realize various functions. Positioning is one of the functions that can be realized by the handheld electronic devices. However, in the field of the indoor positioning technology to perform positioning in a private area, additional hardware cost is needed A multiple of signal sources are needed to perform the indoor positioning in the private area. The cost is high and the method lacks of flexibility.

Accordingly, what is needed is a positioning system and a method of the same to address the issues mentioned above.

SUMMARY

An aspect of the present disclosure is to provide a positioning system. The positioning system includes a wireless signal source and a handheld electronic device. The wireless signal source is disposed at a known fixed location in an area. The handheld electronic device includes a compass, a wireless transmission module and a processing module. The wireless transmission module is wirelessly connected to the wireless signal source to perform a wireless signal transmission with the wireless signal source. The processing module retrieves an information of a fixed direction from the compass, determines a first azimuth angle among the handheld electronic device, the wireless signal source, and the fixed direction according to a first-maximum-signal-strength direction of the wireless transmission module relative to the wireless signal source and determines a first distance between the handheld electronic device and the wireless signal source according to a first wireless transmission parameter between the wireless transmission module and the wireless signal source. The processing module further determines a first absolute location of the handheld electronic device within the area according to the first azimuth angle and the first distance.

According to an embodiment of the present disclosure, the first wireless transmission parameter is a round trip time of the wireless signal transmission between the wireless transmission module and the wireless signal source.

According to another embodiment of the present disclosure, the first wireless transmission parameter is a received signal strength of the wireless signal transmission between the wireless transmission module and the wireless signal source.

According to yet another embodiment of the present disclosure, the wireless transmission module comprises a multi-antenna unit to determine the first-maximum-signal-strength direction.

According to another embodiment of the present disclosure, the fixed direction is a north direction.

According to yet another embodiment of the present disclosure, the compass is a physical compass disposed in the handheld electronic device.

According to yet another embodiment of the present disclosure, the handheld electronic device further comprises a storage module, and the compass is a compass application program stored in the storage module.

According to yet another embodiment of the present disclosure, the positioning system further includes a wearable electronic device to perform a wireless transmission with the handheld electronic device to determine a second azimuth angle among the handheld electronic device, the wearable electronic device, and the fixed direction according to a second maximum-signal-strength direction of the wearable electronic device and the handheld electronic device and determine a second distance relative to the wearable electronic device and the handheld electronic device according to a second wireless transmission parameter between the wearable electronic device and the handheld electronic device. The wearable electronic device further determines a second absolute location of the wearable electronic device within the area according to the second azimuth angle and the second distance.

According to yet another embodiment of the present disclosure, the wireless signal source is a wireless access point.

Another aspect of the present disclosure is to provide a positioning method. The positioning method is used in a positioning system. The positioning method includes the steps outlined below. A wireless signal source is disposed at a known fixed location in an area. A wireless transmission module of a handheld electronic device is wirelessly connected to the wireless signal source to perform a wireless signal transmission with the wireless signal source. An information of a fixed direction is retrieved from a compass of the handheld electronic device by a processing module of the handheld electronic device. A first azimuth angle among the handheld electronic device, the wireless signal source, and the fixed direction is determined by the processing module according to a first maximum-signal-strength direction of the wireless transmission module relative to the wireless signal source. A first distance between the handheld electronic device and the wireless signal source is determined by the processing module according to a first wireless transmission parameter between the wireless transmission module and the wireless signal source. A first absolute location of the handheld electronic device within the area is determined by the processing module according to the first azimuth angle and the first distance.

According to an embodiment of the present disclosure, the first wireless transmission parameter is a round trip time of the wireless signal transmission between the wireless transmission module and the wireless signal source.

According to another embodiment of the present disclosure, the first wireless transmission parameter is a received signal strength of the wireless signal transmission between the wireless transmission module and the wireless signal source.

According to another embodiment of the present disclosure, the wireless transmission module comprises a multi-antenna unit to determine the first maximum signal strength direction.

According to yet another embodiment of the present disclosure, the fixed direction is north direction.

According to yet another embodiment of the present disclosure, the compass is a physical compass disposed in the handheld electronic device.

According to yet another embodiment of the present disclosure, the handheld electronic device further comprises a storage module, and the compass is a compass application program stored in the storage module.

According to yet another embodiment of the present disclosure, the positioning method further includes the steps outlined below. A wireless transmission with the handheld electronic device is performed by a wearable electronic device. A second azimuth angle among the handheld electronic device, the wearable electronic device, and the fixed direction is determined according to a second maximum signal strength direction of the wearable electronic device relative to the handheld electronic device. A second distance between the wearable electronic device and the handheld electronic device is determined according to a second wireless transmission parameter between the wearable electronic device and the handheld electronic device. A second absolute location of the wearable electronic device within the area is determined according to the second azimuth angle and the second distance.

According to yet another embodiment of the present disclosure, the wireless signal source is a wireless access point.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
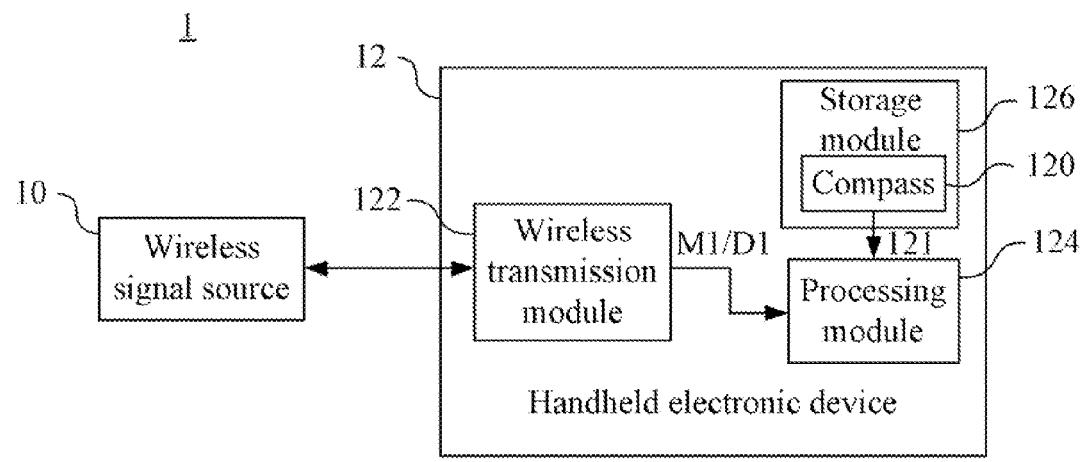
FIG. 1 is a block diagram of a positioning system in an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
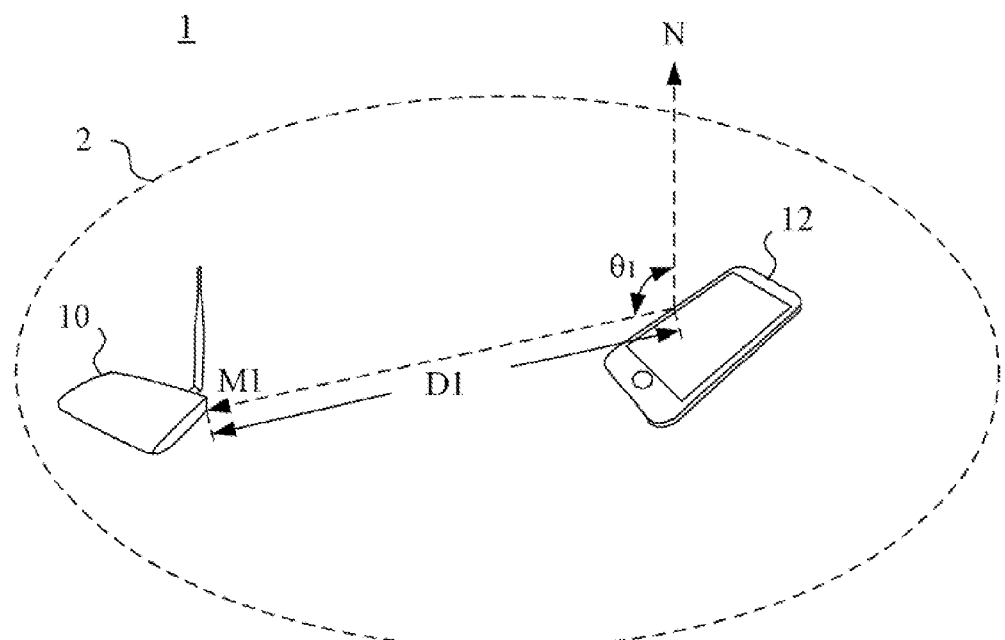
FIG. 2 is a diagram of the positioning system within an area in an embodiment of the present disclosure.

Reference is made to FIG. 1 and FIG. 2 at the same time. FIG. 1 is a block diagram of a positioning system 1 in an embodiment of the present disclosure. FIG. 2 is a diagram of the positioning system 1 within an area 2 in an embodiment of the present disclosure. The positioning system 1 includes a wireless signal source 10 and a handheld electronic device 12.

In an embodiment, the wireless signal source 10 is a wireless access point and is disposed at a known fixed location in the area 2. The area 2 is a coverage area of any wireless signal source 10, such as but not limited to a floor of a building. The known fixed location can be a specific corner of the floor, such as but not limited to a corner in a living room.

In an embodiment, the handheld electronic device 12 can be such as, but not limited to a smartphone, a tablet personal computer, a notebook computer or other portable electronic device. The handheld electronic device 12 includes a compass 120, a wireless transmission module 122 and a processing module 124.

In an embodiment, the handheld electronic device 12 can further include a storage module 126, and the compass 120 is a compass application program stored in the storage module 126. In other embodiments, the compass 120 can be a physical compass disposed in the handheld electronic device 12. In an embodiment, the compass 120 indicates the north direction such that the north direction can be continuously obtained. In an embodiment, the compass 120 indicates the south direction such that the south direction can be continuously obtained.

The wireless transmission module 122 is wirelessly connected to the wireless signal source 10 to perform a wireless signal transmission with the wireless signal source 10. In an embodiment, the wireless signal transmission between the wireless transmission module 122 and the wireless signal source 10 is performed by using radio frequency signals. In an embodiment, the wireless transmission module 122 includes a multi-antenna unit such that the relation between the amount of the signal strength and the direction of the signal can be obtained according to the signal transmission between the multi-antenna unit and the wireless signal source 10.

The processing module 124 retrieves information 121 of a fixed direction N illustrated in FIG. 2 from the compass 120. As described above, when the compass 120 indicates the north direction, the fixed direction N is the north direction. When the compass 120 indicates the south direction, the fixed direction N is the south direction.

The processing module 124 further determines an azimuth angle $\theta_1$ among the handheld electronic device 12, the wireless signal source 10, and the fixed direction N according to a maximum-signal-strength direction M1 of the wireless transmission module 122 relative to the wireless signal source 10. Subsequently, the processing module 124 determines a distance D1 between the handheld electronic device 12 and the wireless signal source 10 according to a wireless transmission parameter between the wireless transmission module 122 and the wireless signal source 10.

In an embodiment, the wireless transmission parameter is a round trip time of the wireless signal transmission between the wireless transmission module 122 and the wireless signal source 10. The round trip time and the transmission speed of the signal can be used to determine the distance D1 between the wireless transmission module 122 and the wireless signal source 10.

In another embodiment, the wireless transmission parameter is a received signal strength of the wireless signal transmission between the wireless transmission module 122 and the wireless signal source 10. The signal strength decayed with the distance can be used to determine the distance D1 between the wireless transmission module 122 and the wireless signal source 10. In an embodiment, the storage module 126 can store the decay relation about the signal strength and the distance such that the processing module 124 can perform the determination based on the decay relation after obtaining the information of the strength of received signal.

It is appreciated that the wireless transmission parameters of the round trip time and the received signal strength are merely an example. In other embodiments, other types of wireless transmission parameters can be used by the processing module 124 to determine the distance D1 between the wireless transmission module 122 and the wireless signal source 10.

Subsequently, the processing module 124 further determines an absolute location of the handheld electronic device 12 within the area 2 according to the azimuth angle $\theta_1$ and the distance D1 In an embodiment, the storage module 126 stores the relative information of the area 2 such as the amount of the area, the shape, the layout and other parameters, such that the processing module 124 can determine the absolute location of the handheld electronic device 12 within the area 2 according to the azimuth angle $\theta_1$ and the distance D1.

For example, the storage module 126 stores the information of a floor including the relative positions, the area, the length and the width of each rooms within the floor, and the position of the known fixed location within the floor that the wireless signal source 10 is located. As a result, the processing module 124 can quickly determine the absolute location of the handheld electronic device 12 within the floor according to the azimuth angle $\theta_1$ and the distance D1.

As a result, the advantage of the present application is to use the handheld electronic device 12 to obtain the information of the fixed direction N from the compass 120 and further perform the wireless signal transmission with the wireless signal source 10 located at the known fixed location in the area 2 to obtain the azimuth angle $\theta_1$ and the distance D1. The absolute location of the handheld electronic device 12 within the area 2 can be quickly obtained.

Figure 3:
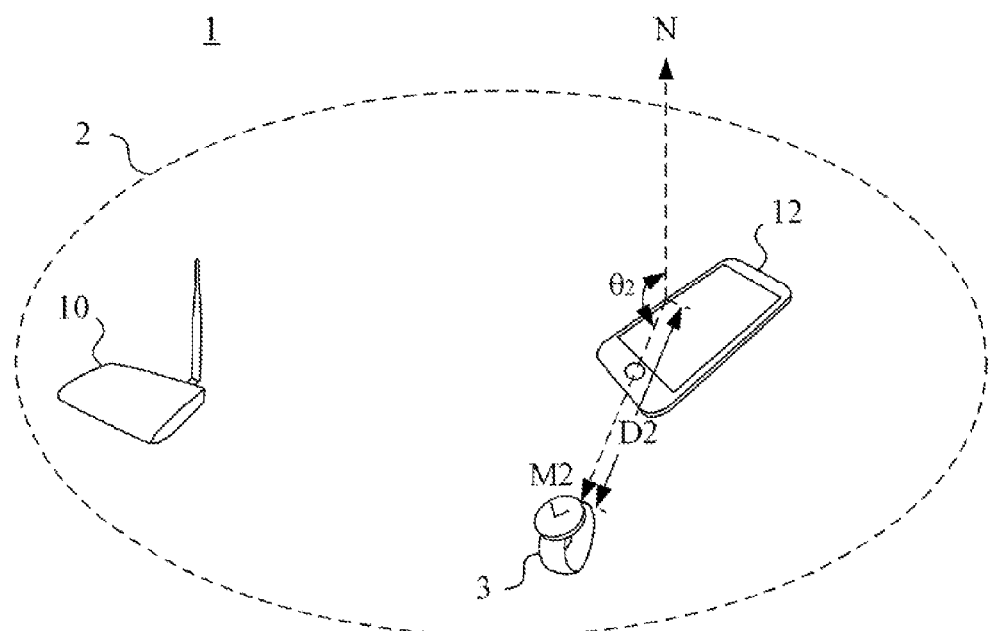
FIG. 3 is a diagram of the positioning system within an area in an embodiment of the present disclosure.

Reference is now made to FIG. 3. FIG. 3 is a diagram of the positioning system 1 within the area 2 in an embodiment of the present disclosure. In the present embodiment, the positioning system 1 further includes a wearable electronic device 3.

The wearable electronic device 3 can be an electronic device that can be put on for a user, such as a digital watch, an electronic bracelet or other devices that can he put on. The wearable electronic device 3 can include such as, but not limited to a processing module and a wireless transmission module (not illustrated) that are able to perform a wireless transmission with the handheld electronic device 12 and obtain the absolute location of the wearable electronic device 3 by using a method identical to the method used by the handheld electronic device 12 according to the wireless signal source 10 at the known fixed location. In other words, the wearable electronic device 3 can determine an azimuth angle $\theta_2$ among the wearable electronic device 3, the handheld electronic device 12, and the fixed direction N according to a maximum-signal-strength direction M2 of the wearable electronic device 3 relative to the handheld electronic device 12.

Further, the wearable electronic device 3 determines a distance D2 between the wearable electronic device 3 and the handheld electronic device 12 according to a wireless transmission parameter between the wearable electronic device 3 and the handheld electronic device 12. Subsequently, the wearable electronic device 3 further determines an absolute location of the the wearable electronic device 3 within the area 2 according to the azimuth angle $\theta_2$ and the distance D2.

Figure 4:
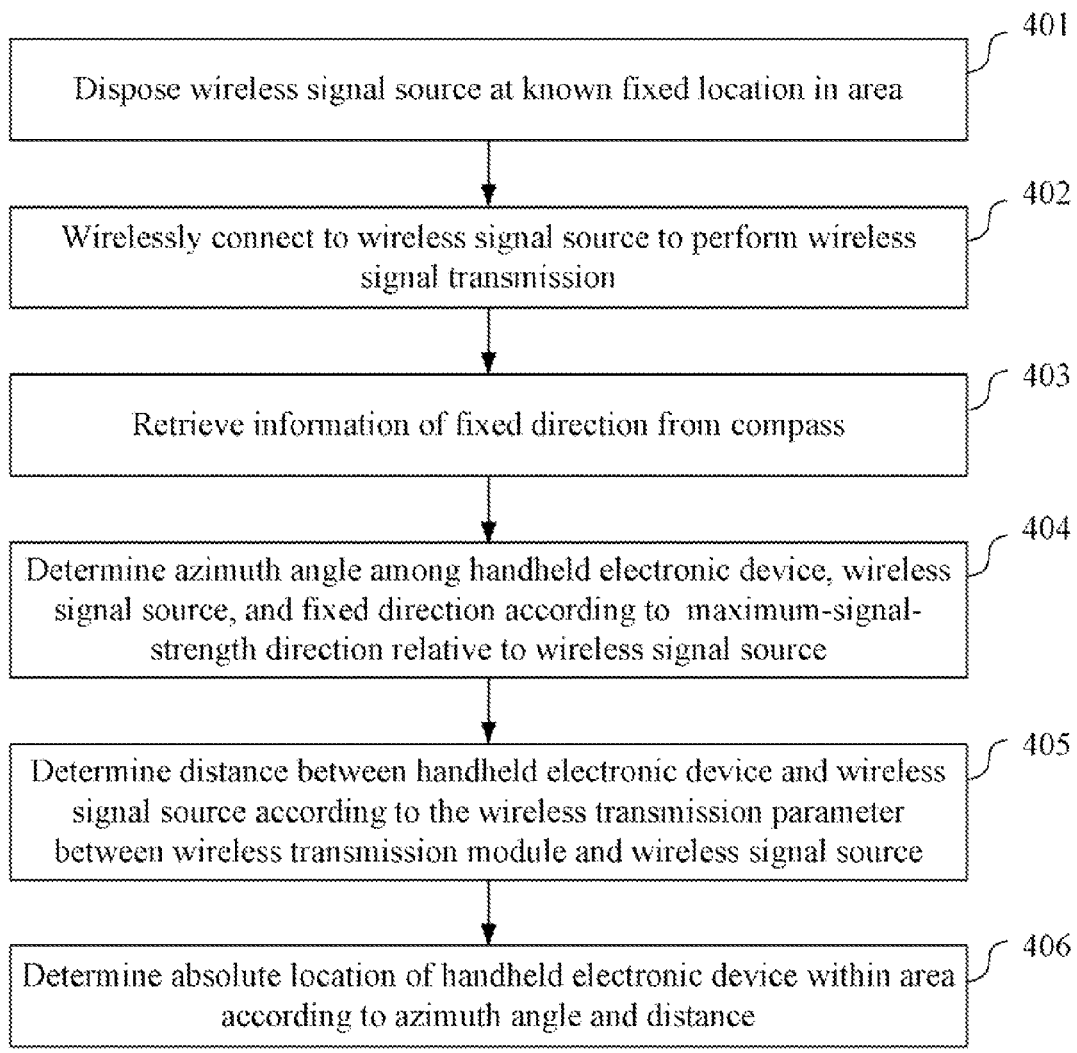
FIG. 4 is a flow chart of a positioning method in an embodiment of the present disclosure.

Reference is now made to FIG. 4. FIG. 4 is a flow chart of a positioning method 400 in an embodiment of the present disclosure. The positioning method 400 can be used in the positioning system 1 illustrated in FIG. 1. The positioning method 400 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 401, the wireless signal source 10 is disposed at the known fixed location in the area 2.

In step 402, the wireless transmission module 122 of the handheld electronic device 12 is wirelessly connected to the wireless signal source 10 to perform a wireless signal transmission with the wireless signal source 10.

In step 403, the information of the fixed direction N is retrieved from the compass 120 of the handheld electronic device 12 by the processing module 124 of the handheld electronic device 12.

In step 404, the azimuth angle 0 among the handheld electronic device 12, the wireless signal source 10, and the fixed direction N is determined by the processing module 124 according to the maximum-signal-strength direction M1 of the wireless transmission module 122 relative to the wireless signal source 10.

In step 405, the distance D1 between the handheld electronic device 12 and the wireless signal source 10 is determined by the processing module 124 according to the wireless transmission parameter between the wireless transmission module 122 and the wireless signal source 10.

In step 406, the absolute location of the handheld electronic device 12 within the area 2 is determined by the processing module 124 according to the azimuth angle $\theta_1$ and the distance D1.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fail within the scope of the following claims.

What is claimed is:

1. A positioning system, comprising:
    a single wireless signal source disposed at a known fixed location in an area; and
    a handheld electronic device comprising:
        a compass;
        a wireless transmission module wirelessly connected to the single wireless signal source to perform a wireless signal transmission;
        a storage module to store a decay relation about a signal strength and a distance; and
        a processing module to retrieve an information of a fixed direction from the compass, determine a first azimuth angle among the handheld electronic device, the single wireless signal source, and the fixed direction according to a first maximum-signal-strength direction of the wireless transmission module relative to the single wireless signal source, and determine a first distance between the handheld electronic device and the single wireless signal source according to a first wireless transmission parameter between the wireless transmission module and the single wireless signal source, wherein the first wireless transmission parameter comprises a received signal strength of the wireless signal transmission between the wireless transmission module and single the wireless signal source, and the processing module determines the first distance based on the decay relation stored in the storage module according to the received signal strength;

wherein the processing module further determines a first absolute location of the handheld electronic device within the area according to the first azimuth angle and the first distance.

2. The positioning system of claim 1, wherein the wireless transmission module comprises a multi-antenna unit to determine the first maximum signal strength direction.

3. The positioning system of claim 1, wherein the fixed direction is a north direction.

4. The positioning system of claim 1, wherein the compass is a physical compass disposed in the handheld electronic device.

5. The positioning system of claim 1, wherein the compass is a compass application program stored in the storage module.

6. The positioning system of claim 1, further comprising a wearable electronic device to perform a wireless transmission with the handheld electronic device so as to determine a second azimuth angle among the handheld electronic device, the wearable electronic device, and the fixed direction according to a second maximum-signal-strength direction of the wearable electronic device relative to the handheld electronic device, and determine a second distance between the wearable electronic device and the handheld electronic device according to a second wireless transmission parameter between the wearable electronic device and the handheld electronic device;

wherein the wearable electronic device further determines a second absolute location of the wearable electronic device within the area according to the second azimuth angle and the second distance.

7. The positioning system of claim 1, wherein the single wireless signal source is a wireless access point.

8. A positioning method used in a positioning system, comprising:

disposing a single wireless signal source at a known fixed location in an area;

wirelessly connecting a wireless transmission module of a handheld electronic device to the single wireless signal source to perform a wireless signal transmission;

retrieving an information of a fixed direction from a compass of the handheld electronic device by a processing module of the handheld electronic device;

determining by the processing module a first azimuth angle among the handheld electronic device, the single wireless signal source, and the fixed direction according to a first maximum-signal-strength direction of the wireless transmission module relative to the single wireless signal source;

retrieving a decay relation about a signal strength and a distance stored in a storage module;

determining by the processing module a first distance between the handheld electronic device and the single wireless signal source according to a first wireless transmission parameter between the wireless transmission module and the single wireless signal source, wherein the first wireless transmission parameter comprises a received signal strength of the wireless signal transmission between the wireless transmission module and the single wireless signal source, and the processing module determines the first distance based on the decay relation according to the received signal strength; and determining a first absolute location of the handheld electronic device within the area by the processing module according to the first azimuth angle and the first distance.

9. The positioning method of cliam 8, wherein the wireless transmission module comprises a multi-antenna unit to determine the first maximum-signal-strength direction.

10. The positioning method of claim 8, wherein the fixed direction is a north direction.

11. The positioning method of claim 8, wherein the compass is a physical compass disposed in the handheld electronic device.

12. The positioning method of claim 8, wherein the compass is a compass application program stored in the storage module.

13. The positioning method of claim 8, further comprising:

performing a wireless transmission with the handheld electronic device by a wearable electronic device;

determining a second azimuth angle among the handheld electronic device, the wearable electronic device, and the fixed direction according to a second maximum-signal-strength direction of the wearable electronic device relative to the handheld electronic device;

determining a second distance between the wearable electronic device and the handheld electronic device according to a second wireless transmission parameter between the wearable electronic device and the handheld electronic device; and determining a second absolute location of the wearable electronic device within the area according to the second azimuth angle and the second distance.

14. The positioning method of claim 8, wherein the single wireless signal source is a wireless access point.

* * * * *